(No Model.) 2 Sheets—Sheet 1.
B. C. BATCHELLER.
CARRIER FOR PNEUMATIC DISPATCH APPARATUS.
No. 540,133. Patented May 28, 1895.
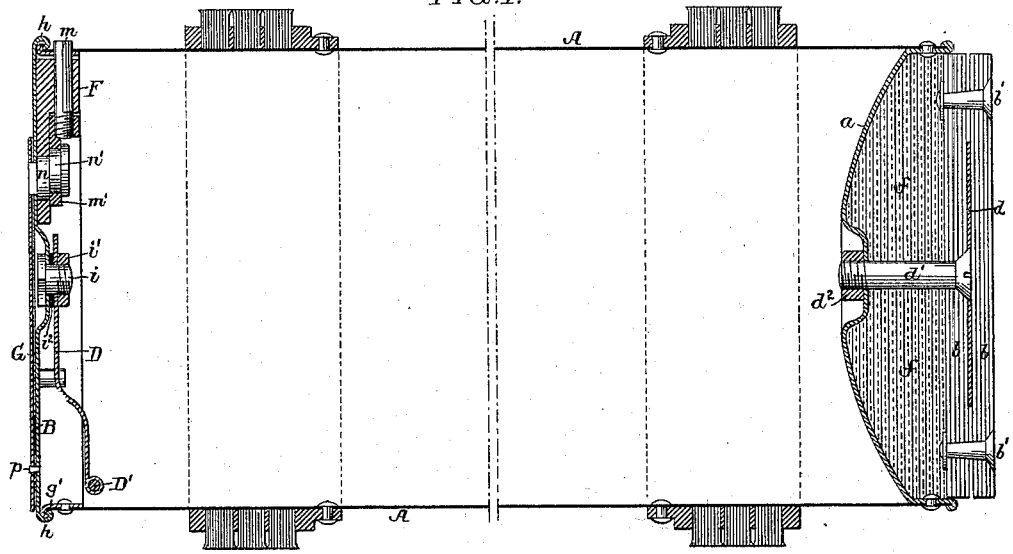
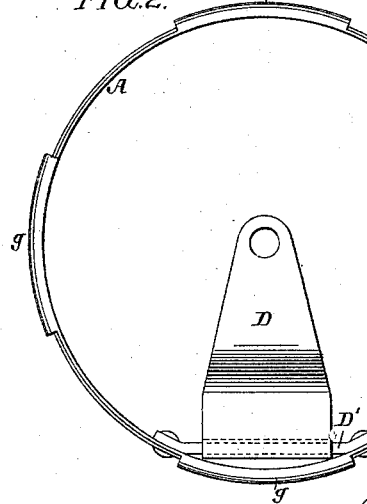
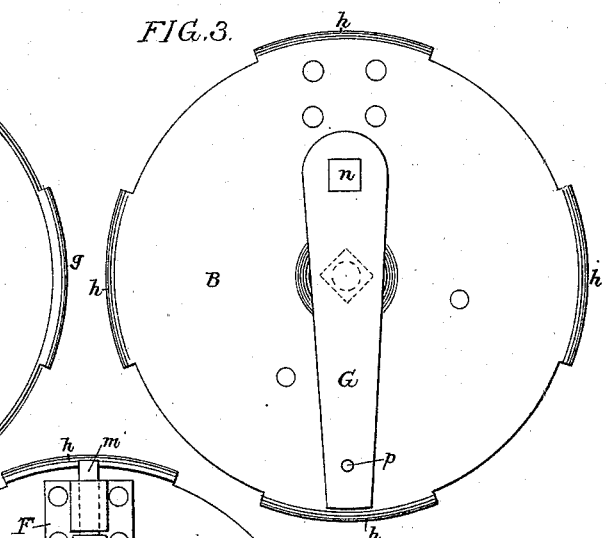
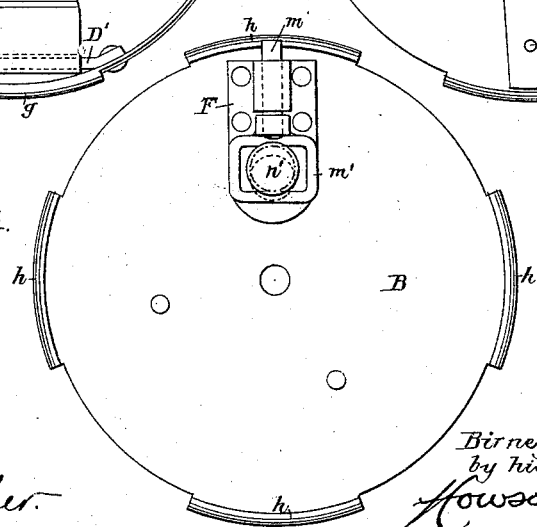
Witnesses:
Alex Barkoff.
R. Schleicher.
Inventor:
Birney C. Batcheller
by his Attorneys
Howson & Howson (No Model.) 2 Sheets—Sheet 2.
B. C. BATCHELLER.
CARRIER FOR PNEUMATIC DISPATCH APPARATUS.

No. 540,133. Patented May 28, 1895.

Witnesses:
Alex. Barkoff
R. Schleicher

Inventor:
Birney C. Batcheller
by his Attorneys
Howson & Howson

UNITED STATES PATENT OFFICE.

BIRNEY C. BATCHELLER, OF PHILADELPHIA, PENNSYLVANIA.

CARRIER FOR PNEUMATIC DISPATCH APPARATUS.

SPECIFICATION forming part of Letters Patent No. 540,133, dated May 28, 1895.

Application filed March 20, 1893. Serial No. 466,771. (No model.)

*To all whom it may concern:*

Be it known that I, BIRNEY C. BATCHELLER, a citizen of the United States, residing in Philadelphia, Pennsylvania, have invented certain Improvements in Carriers for Pneumatic Dispatch Apparatus, of which the following is a specification.

One object of my invention is to simplify the construction and application of the buffer head of the carrier, and a further object is to provide means for securely attaching and locking the cap at the other end of the carrier and to prevent the insertion of the carrier into the tube until said cap has been closed and locked, and to prevent the end or cap from becoming detached in the tube. These objects I attain in the manner hereinafter set forth, reference being had to the accompanying drawings, in which—

Figure 5:
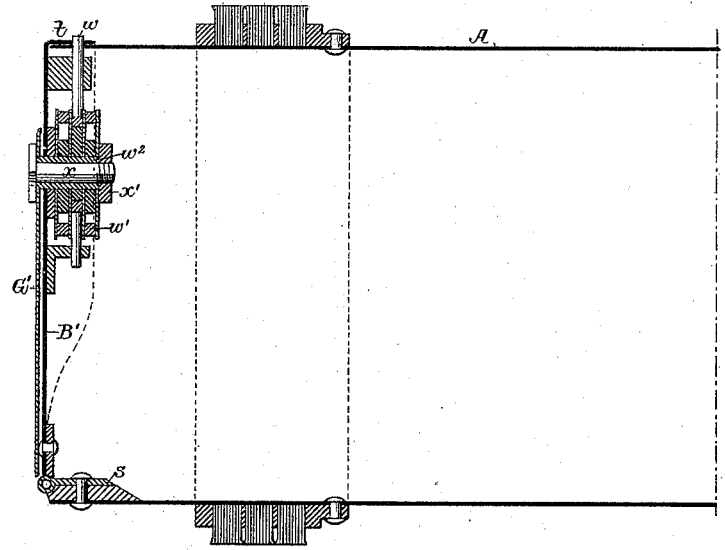
Figure 6:
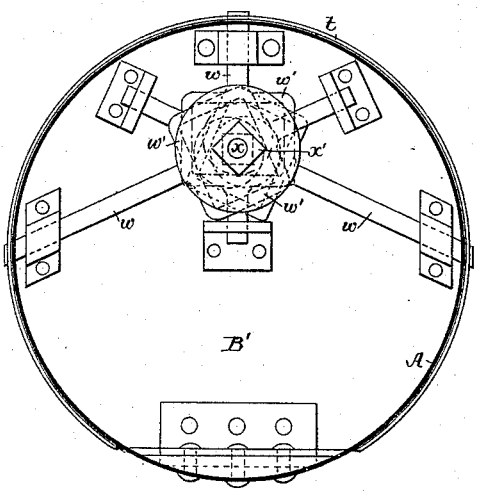

Figure 1 is a longitudinal section of a carrier for pneumatic dispatch apparatus constructed in accordance with my invention. Fig. 2 is an end view of the carrier with the cap removed therefrom. Fig. 3 is a view of the outer side of the cap. Fig. 4 is a view of the inner side of the same. Fig. 5 is a longitudinal section of part of a carrier, illustrating modified devices for hanging and locking the cap; and Fig. 6 is a view of the inner side of the cap shown in Fig. 5.

A represents the cylindrical body or shell of the carrier which is preferably made of sheet metal or other available material, and has at the forward end a head of considerable bulk, this head sometimes acting as a buffer for the carrier when the latter leaves the pipe. In the present instance the head is composed of a concavo-convex plate $a$, flanged at the edge and secured by riveting (or it may be secured by soldering or brazing) to the end portion of the carrier shell, the outer plate or slab of the head consisting of a pair of disks $b$ of rubber, leather, felt or like material, secured together by rivets $b'$ and confining between them a plate $d$ of sheet metal which serves as a bearing for the head of a bolt $d'$. Between the plate $a$ and the inner slab $b$ of the head is interposed packing $f$ of felt or like material and the bolt $d'$ passes through the inner slab $b$ of the head, through this packing $f$ and through a central dished portion of the plate $a$, the inner end of the bolt being threaded for the reception of a nut $d^2$ which is contained within the dished portion of the plate, as shown in Fig. 1. By this means the securing of the head to the carrier shell is facilitated, the riveting of the disks $b$ together being performed while the head is detached from the said shell so that all that remains to be done after the head is applied is the screwing up of the nut $d^2$ upon the inner projecting end of the bolt $d'$, or the riveting of a single rivet in case such rivet is employed in place of the bolt.

The rear end of the carrier shell is flanged, and portions of the flange are cut away, the parts $g$ that remain being preferably reinforced by the ring $g'$ which has projecting portions corresponding with the flange sections $g$, and is riveted or otherwise secured to the shell, the flange of the cap B being likewise cut away so as to form flange sections $h$ adapted to engage with the flange sections $g$ of the carrier.

The cap B is hung to the carrier shell by means of a hinge plate D pivotally mounted at its outer end upon a cross bar D' riveted to the said shell, the inner end of said hinge plate being secured to the cap B by means of a bolt $i$ and nut $i'$, the head of the bolt resting in a central dished portion of the cap, and a washer $i^2$ being interposed between this dished portion of the cap and the arm D so as to permit of the turning of the cap on the arm and yet prevent any rattling or lost motion of said cap.

Bolted or riveted to the inner side of the cap B is a block F which serves as a guide for a bolt $m$, the inner end of the latter being secured to a yoke $m'$ which embraces the eccentric portion $n'$ of a short shaft $n$, the latter being adapted to a bearing in the block F and extending through an opening in the cap for the reception of an operating arm or bar G. When this arm or bar is in the position shown in Figs. 1 and 3, the bolt $m$ is projected through an opening in the carrier shell A, and the cap B is thus securely locked to said shell, but by turning the arm or bar G in either direction the bolt may be withdrawn and the cap unlocked. It will be observed, however, that as the arm G is pivoted eccentrically in respect to the cap B, any swinging movement of the arm in either direction will carry its outer end beyond the circumferential limits of the carrier, and if the movement of the arm is continued to such an extent as to withdraw the bolt, this projection of the arm will be such that it will be impossible to introduce the carrier into the dispatch tube. Hence the locking of the cover B to the carrier shell must be effected before the carrier can be introduced into the tube, thereby effectually guarding against accidents due to carelessness on the part of the attendants who handle the carriers. Moreover, when the carrier is once in the dispatch tube, the cap cannot become unlocked because the arm G will come in contact with the side of the tube before the bolt is withdrawn. Any escape of the contents of the carrier into the dispatch tube during transit is thus rendered impossible.

A pin $p$ on the arm G may be adapted to an opening in the cap B so as to retain said arm in the position shown in Fig. 3 and prevent accidental displacement, the arm having sufficient elasticity to permit of the withdrawal of the pin before turning the arm, or the construction may be reversed if desired, that is to say, the pin may be on the cap and the opening may be formed in the arm.

After the bolt $m$ is withdrawn so as to unlock the cap B the latter is turned until its segmental flanges register with the spaces between the flange sections on the carrier shell, whereupon the cap is free to swing open, and in closing the carrier the operations are reversed, that is to say, the flanges on the cap are first passed through the spaces between the flanges on the carrier shell, and the cap is then turned so as to cause these flanges to engage with each other, after which the bolt is projected so as to lock the cap to the said carrier shell.

In Figs. 5 and 6 I have illustrated a modified construction in which the cap B' is hung directly to a block $s$ on the inside of the carrier shell, and has a segmental flange $t$ overlapping the end of said shell. In this case I prefer to employ a series of bolts $w$, the yoke of each bolt being acted upon by an eccentric $w'$ upon a shaft $w^2$ which passes through an opening in the cap B', and is confined thereto by a bolt $x$ and nut $x'$, the projecting portion of the shaft having an arm G' whereby the eccentrics are operated so as to project and retract the bolt. In this case the bolts pass through both the shell of the carrier and the overlapping flange of the cap, as shown in Fig. 5.

In some cases the overlapping flanges on the cap and carrier shell may be relied upon to lock the cap, the use of the locking bolt or bolts being dispensed with, or the overlapping flanges may be dispensed with and reliance placed entirely on the locking bolt or bolts, and the securing devices for the cap are applicable to detachable as well as to hinged caps.

Having thus described my invention, I claim and desire to secure by Letters Patent—

1. The combination of the shell of the carrier, and the end plate, located within the carrier with the buffer head consisting of packing bearing upon said plate, an outer slab having a central projecting bolt or rivet, and means for securing said bolt or rivet to the end plate of the shell, said outer slab and packing being of such restricted diameter that the slab is free to enter the shell of the carrier substantially as specified.

2. The combination of the shell of the carrier, the end plate of the same, packing bearing upon said end plate, a series of outer disks secured together, a metal plate confined between said disks, and a bolt or rivet having a bearing upon said plate and secured to the end plate of the shell, substantially as specified.

3. The combination of the shell of the carrier, the cap therefor, one or more bolts for locking the cap to the shell of the carrier, and a bolt-operating arm or bar so mounted upon the cap that when the same is unlocked, said arm or bar will project beyond the circumferential limits of the carrier to such an extent as to prevent the introduction of said carrier into the tube, substantially as specified.

4. The combination of the shell of the carrier, the cap, a sliding bolt for locking the cap to the carrier, an eccentric shaft and yoke for operating said bolt, and an arm or bar secured to said shaft and having its axis eccentric in respect to that of the cap or carrier, substantially as specified.

5. The combination of the shell of the carrier, an arm hinged thereto, a cap carried by said arm, and means for securing said cap to the shell of the carrier, substantially as specified.

6. The combination of the shell of the carrier, an arm hinged thereto, and a cap hung to said arm so as to be free to turn thereon, said shell and cap having engaging flanges whereby, on turning the cap, the same is secured to the shell of the carrier, substantially as specified.

7. The combination of the shell of the carrier having segmental flanges thereon, an arm hinged to said carrier shell, and a cap hung to said arm and free to turn thereon, said cap likewise having segmental flanges adapted to engage with those of the carrier, substantially as specified.

8. The combination of the shell of the carrier, the arm hinged thereto, the cap hung to said arm so as to be free to turn thereon, engaging flanges on the shell and cap, and a locking bolt and bolt-operating mechanism carried by said cap and serving to lock the same to the carrier, substantially as specified.

In testimony whereof I have signed my name to this specification in the presence of two subscribing witnesses.

BIRNEY C. BATCHELLER.

Witnesses:
FRANK E. BECHTOLD,
JOSEPH H. KLEIN.